US012748764B2

(12) United States Patent
Nanda

(10) Patent No.: US 12,748,764 B2
(45) Date of Patent: Sep. 29, 2026

(54) SYSTEM AND METHOD FOR DISTRIBUTED QUERY EXECUTION VIA QUERY FEDERATION USING SEMANTIC MODEL QUERY PLANS

(71) Applicant: ORACLE INTERNATIONAL CORPORATION, Redwood Shores, CA (US)

(72) Inventor: Sambit Nanda, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 19/054,466

(22) Filed: Feb. 14, 2025

(65) Prior Publication Data

US 2026/0244631 A1 Aug. 20, 2026

(51) Int. Cl.
*G06F 16/2458* (2019.01)
*G06F 16/2455* (2019.01)
*G06F 40/30* (2020.01)

(52) U.S. Cl.
CPC ...... *G06F 16/2471* (2019.01); *G06F 16/2456* (2019.01); *G06F 40/30* (2020.01)

(58) Field of Classification Search
CPC ... G06F 16/2471; G06F 16/2456; G06F 40/30
See application file for complete search history.

(56) References Cited

U.S. PATENT DOCUMENTS 5,768,578 A 6/1998 Kirk
7,383,247 B2 6/2008 Li
9,508,048 B2 11/2016 Said
10,740,304 B2 8/2020 Fokoue-Nkoutche
12,204,538 B1 1/2025 Srinivasan
12,259,902 B1 * 3/2025 Tsoungui .............. G06F 16/254
2019/0220464 A1 7/2019 Butani
2020/0004848 A1 * 1/2020 Wood ..................... G06N 5/022
(Continued)

OTHER PUBLICATIONS

Stefanie Rhone, Oracle, Oracle® Cloud Building Semantic Models in Oracle Analytics Cloud, F42838-29. Jan. 2025, Copyright @ 2022, 2025, 329 pages.
(Continued)

*Primary Examiner* — Dangelino N Gortayo
(74) *Attorney, Agent, or Firm* — TUCKER ELLIS LLP

(57) ABSTRACT

A system and method for distributed query execution via query federation using semantic model query plans. Within a cloud or data analytics environment, customers may have different requirements with regard to how their data is classified, aggregated, or transformed, for purposes of providing data analytics. To support such requirements, the system can include a definition of semantic models associated with the customer's data. In response to a query associated with one or more semantic models, the system generates a composite query execution plan that includes nodes directed to federated query engines having access to the semantic models. The original query is effectively partitioned such that portions of the query are distributed to concurrently-running query engines for parallel execution or processing. The described approach can also be used to efficiently process queries potentially spanning multiple semantic models.

20 Claims, 12 Drawing Sheets

(56) References Cited

U.S. PATENT DOCUMENTS

| | | | | |
|---|---|---|---|---|
| 2021/0250415 | A1 | 8/2021 | Danilchenko | |
| 2022/0138189 | A1 | 5/2022 | Eng | |
| 2022/0197899 | A1 * | 6/2022 | Kanani | G06F 16/285 |
| 2022/0237103 | A1 | 7/2022 | Agrawal | |
| 2022/0292092 | A1 * | 9/2022 | Brown | G06F 16/2458 |
| 2023/0081067 | A1 | 3/2023 | Mittal | |
| 2023/0081212 | A1 | 3/2023 | Surendran | |
| 2023/0087339 | A1 | 3/2023 | Lions | |
| 2023/0266998 | A1 | 8/2023 | Bhattacharya | |
| 2023/0297586 | A1 | 9/2023 | Beemanapalli | |
| 2023/0396518 | A1 | 12/2023 | Strassner | |
| 2024/0126719 | A1 | 4/2024 | Ma | |
| 2024/0126725 | A1 | 4/2024 | Ramirez | |
| 2024/0126775 | A1 | 4/2024 | Shmulyan | |
| 2024/0126776 | A1 | 4/2024 | Shmulyan | |
| 2024/0370479 | A1 | 11/2024 | Hudetz | |
| 2024/0378208 | A1 * | 11/2024 | Zhou | G06F 16/24561 |
| 2025/0013911 | A1 | 1/2025 | Agrawal | |
| 2025/0014118 | A1 | 1/2025 | Agrawal | |
| 2025/0335491 | A1 | 10/2025 | Joshi | |
| 2025/0363109 | A1 | 11/2025 | Li | |

OTHER PUBLICATIONS

Stefanie Rhone, Oracle, Oracle® Analytics Building Semantic Models in Oracle Analytics Server, F91008-01, Mar. 2024, Copyright @ 2024, 287 pages.

Stefanie Rhone, "About a Semantic Model's Architecture", Feb. 4, 2025, 2 pages, <https://docs.oracle.com/en/cloud/paas/analytics-cloud/acmdg/how-does-semantic-model-query-data.html>.

Stefanie Rhone, "How Does a Semantic Model Query Data?", Feb. 4, 2025, 2 pages, <https://docs.oracle.com/en/cloud/paas/analytics-cloud/acmdg/semantic-models-architecture.html>.

Brahmajeet Desai, "Kyvos Advantage Over Power BI Semantic Model", Feb. 4, 2025, 2 pages, <https://www.kyvosinsights.com/blog/how-kyvos-semantic-layer-performs-better-than-power-bi-semantic-models/>.

Suchismita Sahu, "Semantic Data Fabric, The Challenge", Medium, Oct. 14, 2024, 29 pages, <https://ssahuupgrad-93226.medium.com/semantic-data-fabric-3dda3e4a0c11>.

Google Cloud, BigQuery overview, Feb. 4, 2025, 4 pages, <https://cloud.google.com/bigquery/docs/introduction>.

Pravin Janardanam, Oracle, "The Semantic Modeler in Oracle Analytics Cloud", Oct. 11, 2022, 6 pages, <https://blogs.oracle.com/analytics/post/the-semantic-modeler-in-oracle-analytics-cloud>.

Microsoft, "Semantic models in the Power BI service", Aug. 28, 2024, 3 pages, <https://learn.microsoft.com/en-us/power-bi/connect-data/service-datasets-understand>.

Laiba Siddiqui, datacamp, "What is a Semantic Layer? A Detailed Guide", Jun. 21, 2024, 13 pages, <https://www.datacamp.com/blog/semantic-layer>.

United States Patent and Trademark Office, Notice of Allowance and Fee(s) Due dated Apr. 30, 2026 for U.S. Appl. No. 19/054,510 , 11 pages.

European Patent Office, Notification of Transmittal of The International Search Report and The Written Opinion of The International Searching Authority, or The Declaration dated May 7, 2026 for International Application No. PCT/US2026/014928 , 13 pages.

Arens, Yigal et al.; Retrieving and Integrating Data From Multiple Information Sources; International Journal on Intelligent and Cooperative Information Systems; vol. 2, No. 2, Jun. 1, 1993; 31 pages.

Sima, Ana Claudia et al.; "Enabling semantic queries across federated bioinformatics databases"; Database: The Journal of Biological Database and Curation, vol. 2019, Article ID baz106; Jan. 2019; 13 pages.

United States Patent and Trademark Office, Office Communication dated Dec. 11, 2025 for U.S. Appl. No. 19/054,510, 21 pages.

* cited by examiner

SYSTEM AND METHOD FOR DISTRIBUTED QUERY EXECUTION VIA QUERY FEDERATION USING SEMANTIC MODEL QUERY PLANS

CROSS-REFERENCE TO RELATED APPLICATIONS

This application is related to U.S. patent application titled "SYSTEM AND METHOD FOR DISTRIBUTED QUERY EXECUTION WITH WORKER NODES OPERATING DIFFERENT SOFTWARE VERSIONS", application Ser. No. 19/054,510, filed Feb. 14, 2025; which above application and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to data analytics environments, and are particularly directed to systems and methods for distributed query execution via query federation using semantic model query plans.

BACKGROUND

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

SUMMARY

In accordance with an embodiment, described herein is a system and method for distributed query execution via query federation using semantic model query plans.

Within a cloud or data analytics environment, customers may have different requirements with regard to how their data is classified, aggregated, or transformed, for purposes of providing data analytics.

To support such requirements, the system can include a definition of semantic models associated with the customer's data. In response to a query associated with one or more semantic models, the system generates a composite query execution plan that includes nodes directed to federated query engines having access to the semantic models. The original query is effectively partitioned such that portions of the query are distributed to concurrently-running query engines for parallel execution or processing. The described approach can also be used to efficiently process queries potentially spanning multiple semantic models.

DETAILED DESCRIPTION

Generally described, within an organization, data analytics enables computer-based examination of large amounts of data, for example to derive conclusions or other information from the data. For example, business intelligence (BI) tools can be used to provide users with business intelligence describing their enterprise data, in a format that enables the users to make strategic business decisions.

Increasingly, data analytics can be provided within the context of enterprise software application environments, such as, for example, an Oracle Fusion Applications environment; or within the context of software-as-a-service (SaaS) or cloud environments, such as, for example, an Oracle Analytics Cloud or Oracle Cloud Infrastructure environment; or other types of analytics application or cloud environments.

Examples of data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

In accordance with an embodiment, described herein is a system and method for distributed query execution via query federation using semantic model query plans.

Within a cloud or data analytics environment, customers may have different requirements with regard to how their data is classified, aggregated, or transformed, for purposes of providing data analytics.

To support such requirements, the system can include a definition of semantic models associated with the customer's data. In response to a query associated with one or more semantic models, the system generates a composite query execution plan that includes nodes directed to federated query engines having access to the semantic models. The original query is effectively partitioned such that portions of the query are distributed to concurrently-running query engines for parallel execution or processing. The described approach can also be used to efficiently process queries potentially spanning multiple semantic models.

Data Analytics Environments

Generally described, data analytics enables the computer-based examination or analysis of large amounts of data, in order to derive conclusions or other information from that data; while business intelligence tools (BI) provide an organization's business users with information describing their enterprise data in a format that enables those business users to make strategic business decisions.

Examples of cloud or data analytics environments and business intelligence tools/servers include Oracle Business Intelligence Server (OBIS), Oracle Analytics Cloud (OAC), and Fusion Analytics Warehouse (FAW), which support features such as data mining or analytics, and analytic applications.

Figure 1:
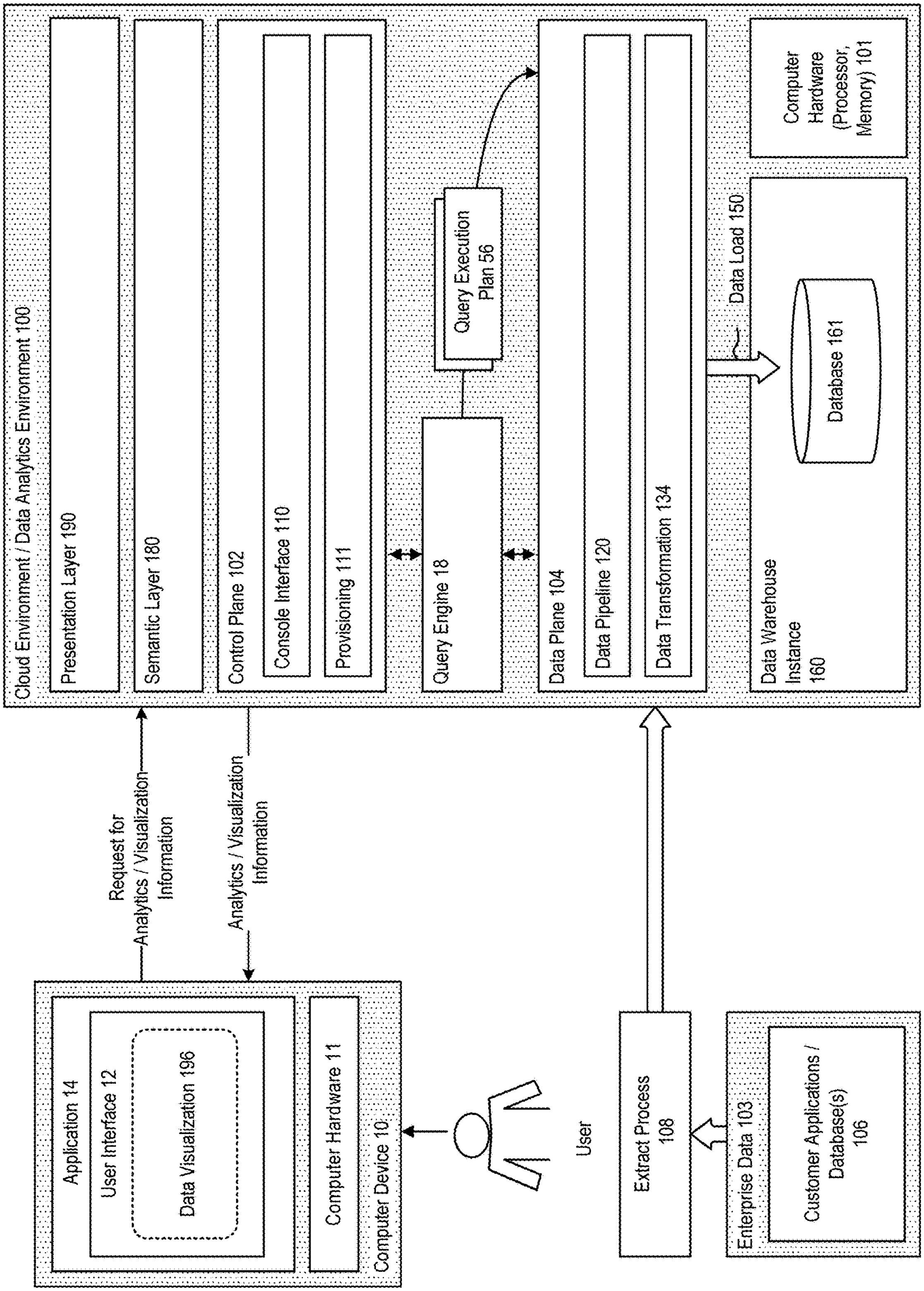
FIG. 1 illustrates an example data analytics system or environment, in accordance with an embodiment.

FIG. 1 illustrates an example cloud or data analytics environment, in accordance with an embodiment.

The example embodiment illustrated in FIG. 1 is provided for purposes of illustrating an example of a cloud or data analytics environment in association with which various embodiments described herein can be used. In accordance with other embodiments and examples, the approach described herein can be used with other types of data analytics, database, or data warehouse environments. The components and processes illustrated in FIG. 1, and as further described herein with regard to various other embodiments, can be provided as software or program code executable by, for example, a cloud computing system, or other suitably-programmed computer system.

As illustrated in FIG. 1, in accordance with an embodiment, a cloud or data analytics environment 100 can be provided by, or otherwise operate at, a computer system having a computer hardware (e.g., processor, memory) 101, and including one or more software components operating as a control plane 102, and a data plane 104, and providing access in the manner of a data layer to a data warehouse instance 160 (e.g., having a database 161, or other type of data source).

In accordance with an embodiment, the control plane operates to provide control for cloud or other software products offered within the context of a cloud environment. For example, in accordance with an embodiment, the control plane can include a console interface 110 that enables access by a customer (tenant) and/or a cloud environment having a provisioning component 111, for example to allow customers to provision services for use within their enterprise environment. The provisioning component can provision a data warehouse instance, including a customer schema of the data warehouse; and populate the data warehouse instance with the appropriate information supplied by the customer.

In accordance with an embodiment, the data plane can include a data pipeline or process layer 120 and a data transformation layer 134, that together process data from an organization's enterprise software environment, and load a transformed data into the data warehouse. The data transformation layer can include a data model, such as, for example, a knowledge model (KM), or other type of data model, that the system uses to transform the data received from business applications and corresponding databases, into a model format understood by the cloud or data analytics environment. The data plane is responsible for performing extract, transform, and load (ETL) operations, including extracting data from an organization's enterprise software environment, transforming the extracted data into a model format, and loading the transformed data into a customer schema of the data warehouse.

For example, in accordance with an embodiment, each customer (tenant) of the environment can be associated with their own customer schema; and can be additionally provided with read-only access to the data analytics schema, which can be updated by a data pipeline or process, for example, an ETL process, on a periodic or other basis. For example, a data pipeline or process can be scheduled to execute at intervals (e.g., hourly/daily/weekly) to extract data from an enterprise software environment, such as, for example, business productivity software applications and corresponding databases 106.

In accordance with an embodiment, an extract process 108 can extract the data, whereupon extraction the data pipeline or process can insert extracted data into a data staging area, which can act as a temporary staging area for the extracted data. When the extract process has completed its extraction, the data transformation layer can be used to transform the extracted data into a model format to be loaded into the customer schema of the data warehouse. During the data transformation, the system can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers may have different requirements with regard to how their data is classified, aggregated, or transformed, for providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, a customer may perform modifications to their data source model, to support their particular requirements, for example by adding custom facts or dimensions associated with the data stored in their data warehouse instance; and the system can extend the semantic model accordingly. A semantic model can be defined, for example, in an Oracle environment, as a BI Repository (RPD) file, having metadata that defines logical schemas, physical schemas, physical-to-logical mappings, aggregate table navigation, and/or other constructs that implement the various physical layer, business model and mapping layer, and presentation layer aspects of the semantic model.

In accordance with an embodiment, the presentation layer can enable access to the data content using, for example, a software analytic application, user interface, analytics dashboard, key performance indicators (KPI's); or other type of report or interface as may be provided by products such as, for example, Oracle Analytics Cloud, or Oracle Analytics for Applications.

In accordance with an embodiment, a query engine 18 (e.g., an Oracle Business Intelligence Server, OBIS instance) operates in the manner of a federated query engine to serve analytical queries or requests from clients directed to data stored at a database. The query engine can push down operations to supported databases, in accordance with a query execution plan 56, wherein a logical query can include Structured Query Language (SQL) statements received from the clients; while a physical query includes database-specific statements that the query engine sends to the database to retrieve data when processing the logical query.

In accordance with an embodiment, a user/developer can interact with a client computer device 10 that includes a computer hardware 11 (e.g., processor, storage, memory), user interface 12, and client application 14. A query engine or business intelligence server generally operates to process inbound, e.g., SQL, requests against a database model, build and execute one or more physical database queries, process the data appropriately, and return the data in response to the request.

To accomplish this, in accordance with an embodiment, the query engine can include a logical or business model, or metadata, that describes the data available as subject areas for queries; a request generator that takes incoming queries and turns them into physical queries for use with a connected data source; and a navigator that takes the incoming query, navigates the logical model and generates those physical queries that best return the data required for a particular query.

For example, in accordance with an embodiment, the query engine may employ a logical model mapped to data in a data warehouse, by creating a simplified star schema business model over various data sources so that the user can query data as if it originated at a single source. The information can then be returned to the presentation layer as subject areas, according to business model layer mapping rules.

In accordance with an embodiment, the query engine can process queries against a database according to a query execution plan. During operation the query engine can create a query execution plan which can then be further optimized, for example to perform aggregations of data necessary to respond to a request. Data can be combined together and further calculations applied, before the results are returned to the calling application.

In accordance with an embodiment, a request for data analytics or visualization information can be received via a client application and user interface as described above, and communicated to the cloud or data analytics environment (in the example of a cloud environment, via a cloud service). The system can retrieve an appropriate dataset to address the user/business context, for use in generating and returning the requested data analytics or visualization information to the client, as a data visualization 196.

In accordance with an embodiment, a client application can be implemented as software or computer-readable program code executable by a computer system or processing device, and having a user interface, such as, for example, a software application user interface or a web browser interface. The client application can retrieve or access data via an Internet/HTTP or other type of network connection to the cloud or data analytics environment, or in the example of a cloud environment via a cloud service provided by the environment.

In accordance with an embodiment, the query engine (e.g., OBIS) can process queries against a database according to a query execution plan, that can include various child (leaf) nodes, generally referred to herein in various embodiments as RqLists, for example:

```
Execution plan:
[[
RqList <<191986>> [for database 0:0,0]
  D102.c1 as c1 [for database 0:0,0],
  sum (D102.c2 by [ D102.c1] ) as c2 [for database 0:0,0]
  Child Nodes (RqJoinSpec): << 192970>> [for database 0:0,0]
  RqJoinNode <<192969>> [ ]
    (
      RqList <<193062>> [for database 0:0,0]
        D2.c2 as c1 [for database 0:0,0],
        D1.c2 as c2 [for database 0:0,0]
      Child Nodes (RqJoinSpec): <<193065>> [for database 0:0,0]
        RqJoinNode <<193061>> [ ]
          (
            RqList <<192414>> [for database 0:0,118]
              T1000003.Customer_ID as c1 [for database 0:0,118],
              T1000003.TARGET as c2 [for database 0:0,118]
            Child Nodes (RqJoinSpec): <<192424>> [for database 0:0,118]
              RqJoinNode <<192423>> [ ]
                [users/administrator/dv_joins/multihub/input::##dataTarget]
                    as T1000003
          ) as D1 LeftOuterJoin (Eager) <<192381>> On D1.c1 = D2.c1;
            actual join vectors: [ 0 ] = [ 0 ]
              (
              RqList <<192443>> [for database 0:0,0]
              D104.c1 as c1 [for database 0:0,0],
              nullifnotunique(D104.c2 by [ D104.c1] ) as c2 [for database
0:0,0]
            Child Nodes (RqJoinSpec): <<192928>> [for database 0:0,0]
              RqJoinNode <<192927>> [ ]
                (
                  RqList <<192852>> [for database 0:0,118]
                    T1000006.Customer_ID as c1 [for database 0:0,118],
                    T1000006.Customer_City as c2 [for database 0:0,118]
                  Child Nodes (RqJoinSpec): <<192862>> [for database 0:0,118]
                    RqJoinNode <<192861>> [ ]
                      [users/administrator/dv_joins/my_customers/input::data]
                        as T1000006
              ) as D104
            GroupBy: [ D104. c1] [for database 0:0,0] sort
            OrderBy: c1, Aggs:[ nullifnotunique (D104.c2 by [ D104.c1] ) ]
```

-continued

```
                [for database 0:0,0]
            ) as D2
    ) as D102
GroupBy: [ D102.c1] [for database 0:0,0] sort
OrderBy: c1 asc, Aggs:[ sum(D102.c2 by [ D102.c1] ) ] [for database
0:0,0]
```

Within a query execution plan, each query execution plan component (RqList) represents a block of query in the query execution plan, and generally translates to a SELECT statement. A query execution plan or RqList may have nested child RqLists, similar to how a SELECT statement can select from nested SELECT statements.

In accordance with an embodiment, a query engine can talk to different databases, and for each of these use data-source-specific code generators. A typical strategy is to ship as much SQL execution to the database, by sending it as part of the physical query—this reduces the amount of information being returned to the query engine (e.g., OBIS instance).

In accordance with an embodiment, during operation the query engine or business intelligence server can create a query execution plan which can then be further optimized, for example to perform aggregations of data necessary to respond to a request. Data can be combined together and further calculations applied, before the results are returned to the calling application, for example via an ODBC interface.

In accordance with an embodiment, a complex, multi-pass request that requires multiple data sources may require the query engine or business intelligence server to break the query down, determine which sources, multi-pass calculations, and aggregates can be used, and generate the logical query execution plan spanning multiple databases and physical SQL statements, wherein the results can then be passed back, and further joined or aggregated by the query engine or business intelligence server.

Figure 2:
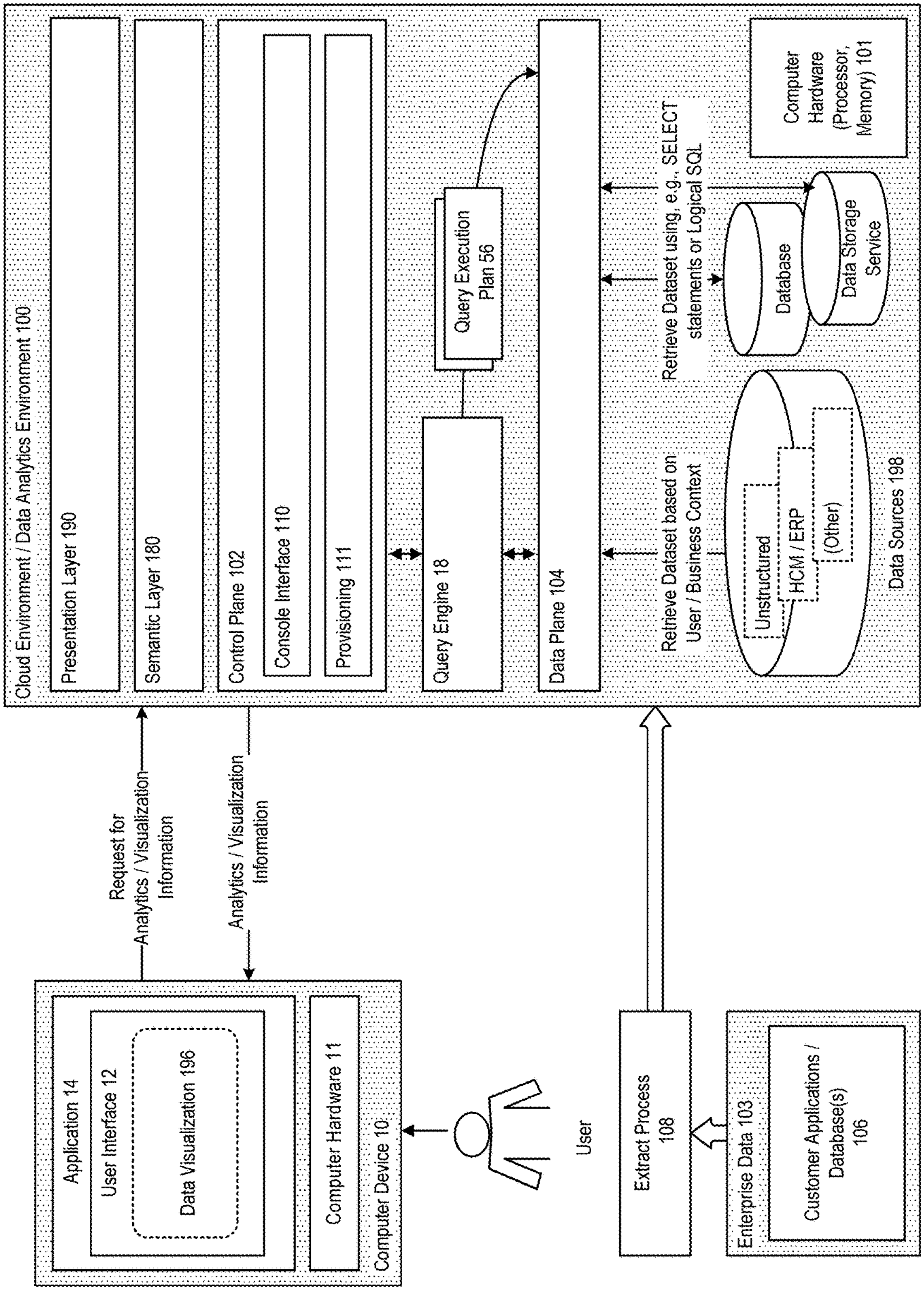
FIG. 2 further illustrates an example cloud or data analytics environment, in accordance with an embodiment.

FIG. 2 further illustrates an example cloud or data analytics environment, in accordance with an embodiment.

As illustrated in FIG. 2, in accordance with an embodiment, the cloud or data analytics environment enables a dataset to be retrieved, received, or prepared from one or more data source(s) 198, for example via one or more data source connections. Examples of the types of data that can be transformed, analyzed, or visualized using the systems and methods described herein include data directed to Enterprise Resource Planning (ERP), Human Capital Management (HCM), or Human Resources (HR), or other types of data provided at one or more of a database, data storage service, or other type of data repository or data source.

For example, in accordance with an embodiment, a request for data analytics or visualization information can be received via a client application and user interface as described above, and communicated to the cloud or data analytics environment, for example via a cloud service. The system can retrieve an appropriate dataset to address the user/business context, for use in generating and returning the requested data analytics or visualization information to the client.

Figure 3:
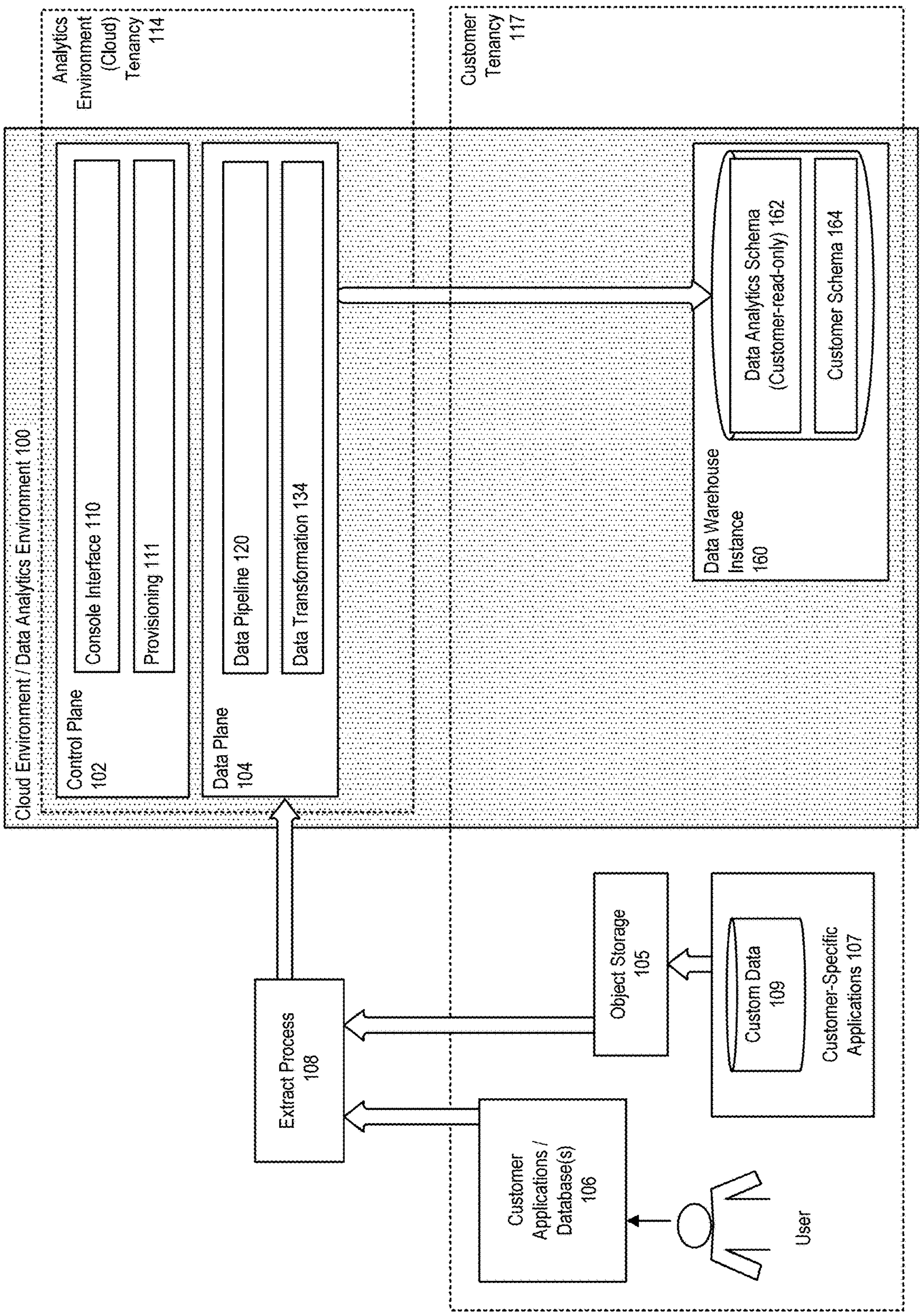
FIG. 3 further illustrates an example cloud or data analytics environment, in accordance with an embodiment.

FIG. 3 further illustrates an example cloud or data analytics environment, in accordance with an embodiment.

As illustrated in FIG. 3, in accordance with an embodiment, data can be sourced, e.g., from a customer's (tenant's) enterprise software environment (106), using the data pipeline process; or as custom data 109 sourced from one or more customer-specific applications 107; and loaded to a data warehouse instance, including in some examples the use of an object storage 105 for storage of the data. A user can create a dataset that uses tables from different connections and schemas. The system uses the relationships defined between these tables to create relationships or joins in the dataset.

In accordance with an embodiment, the data warehouse can include a default data analytics schema 162 and, for each customer (tenant) of the system, a customer schema 164. For each customer (tenant), the system uses the data analytics schema that is maintained and updated by the system, within a system/cloud tenancy 114, to pre-populate a data warehouse instance for the customer, based on an analysis of the data within that customer's enterprise applications environment, and within a customer tenancy 117. As such, the data analytics schema maintained by the system enables data to be retrieved, by the data pipeline or process, from the customer's environment, and loaded to the customer's data warehouse instance.

In accordance with an embodiment, the system also provides, for each customer of the environment, a customer schema that allows the customer to supplement and utilize the data within their own data warehouse instance. For each customer, their resultant data warehouse instance operates as a database whose contents are partly-controlled by the customer; and partly-controlled by the environment (system).

For example, in accordance with an embodiment, a data warehouse can include a data analytics schema and, for each customer/tenant, a customer schema sourced from their enterprise software environment. The data provisioned in a data warehouse tenancy is accessible only to that tenant; while at the same time allowing access to various, e.g., ETL-related or other features of the shared environment.

In accordance with an embodiment, for a particular customer/tenant, upon extraction of their data, the data pipeline or process can insert the extracted data into a data staging area for the tenant, which can act as a temporary staging area for the extracted data. When the extract process has completed its extraction, the data transformation layer can be used to transform the extracted data into a model format to be loaded into the customer schema of the data warehouse.

Figure 4:
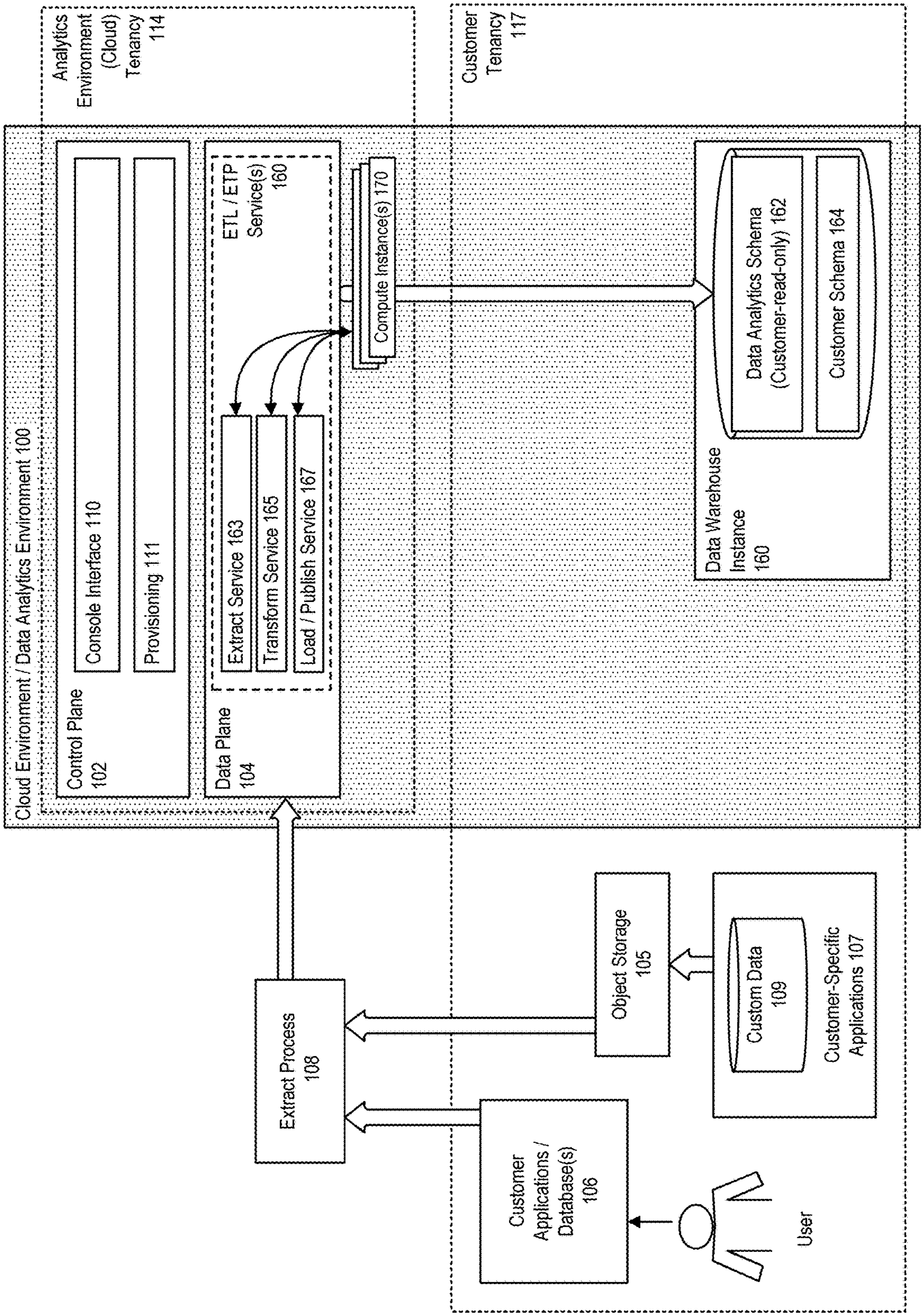
FIG. 4 further illustrates an example cloud or data analytics environment, in accordance with an embodiment.

FIG. 4 further illustrates an example cloud or data analytics environment, in accordance with an embodiment.

As illustrated in FIG. 4, in accordance with an embodiment, the process of extracting data from a customer's (tenant's) enterprise software environment, and loading the data to a data warehouse instance, or refreshing the data in a data warehouse, generally involves several stages, performed by an ETP service 160 or process, including one or more extraction service 163; transformation service 165; and load/publish service 167, executed by one or more compute instance(s) 170.

For example, in accordance with an embodiment, extracted files can be uploaded to an object storage component for storage of the data. The transformation process then applies a business logic while loading them to a target data warehouse, e.g., an Autonomous Data Warehouse (ADW) database, which is internal to the data pipeline or process, and is not exposed to the customer (tenant). A load/publish service or process takes the data from the ADW database and publishes it to a data warehouse instance that is accessible to the customer (tenant).

Figure 5:
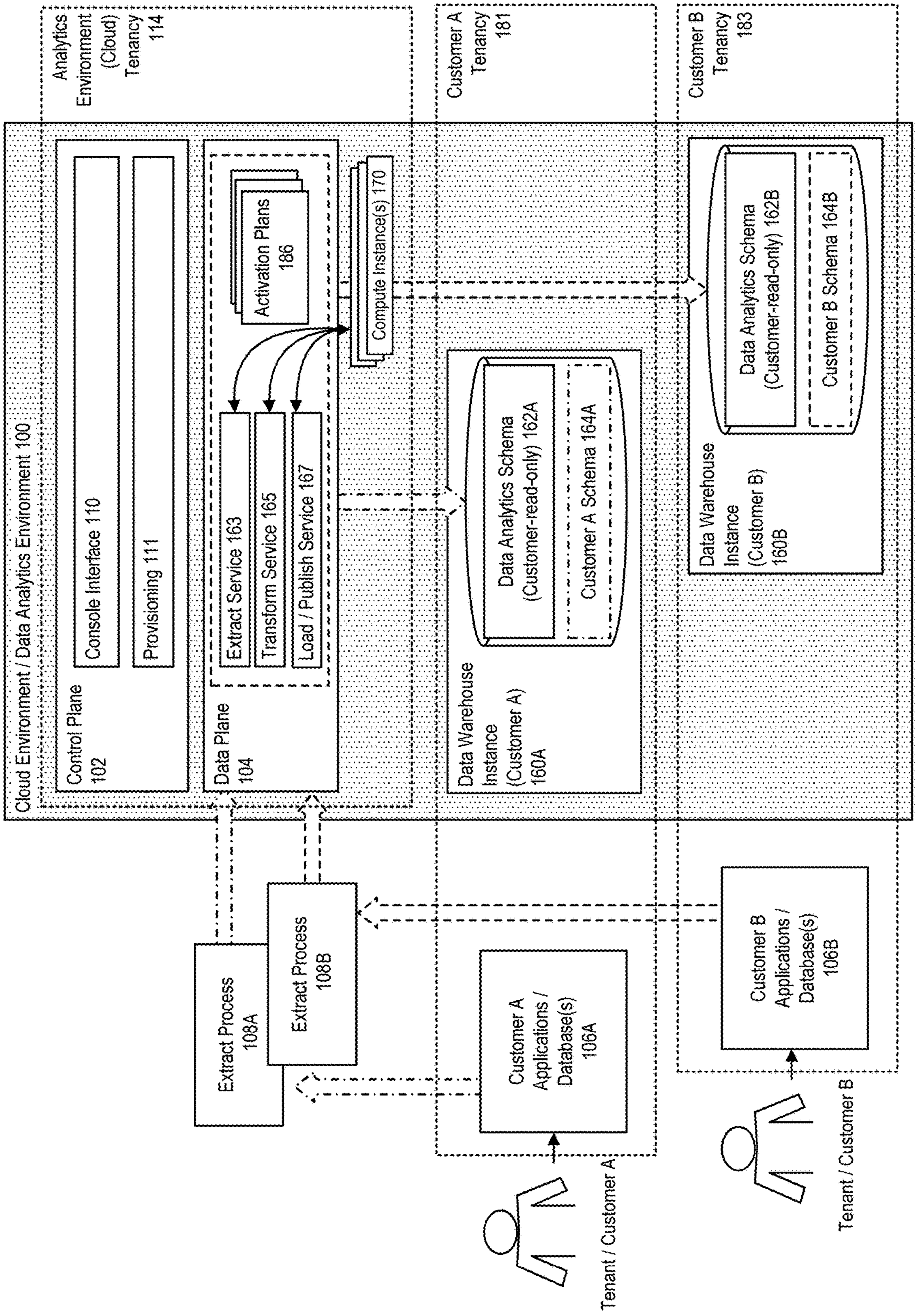
FIG. 5 further illustrates an example cloud or data analytics environment, in accordance with an embodiment.

FIG. 5 further illustrates an example cloud or data analytics environment, in accordance with an embodiment.

As illustrated in FIG. 5, in accordance with an embodiment, the data pipeline or process maintains, for each of a plurality of customers (tenants), for example customer A, customer B, a data analytics schema that is updated on a periodic basis, by the system in accordance with best practices for a particular analytics use case. For each of a plurality of customers (e.g., customers A, B), the system uses the data analytics schema 162A, 162B, that is maintained and updated by the system, to pre-populate a data warehouse instance for the customer, based on an analysis of the data within that customer's enterprise applications environment 106A, 106B, and within each customer's tenancy (e.g., customer A tenancy 181, customer B tenancy 183); so that data is retrieved, by the data pipeline or process, from the customer's environment, and loaded to the customer's data warehouse instance 160A, 160B.

In accordance with an embodiment, the cloud or data analytics environment also provides, for each of a plurality of customers of the environment, a customer schema (e.g., customer A schema 164A, customer B schema 164B) that allows the customer to supplement and utilize the data within their own data warehouse instance.

As described above, in accordance with an embodiment, for each of a plurality of customers of the cloud or data analytics environment, their resultant data warehouse instance operates as a database whose contents are partly-controlled by the customer; and partly-controlled by the cloud or data analytics environment (system); including that their database appears pre-populated with appropriate data that has been retrieved from their enterprise applications environment to address various analytics use cases. When the extract process 108A, 108B for a particular customer has completed its extraction, the data transformation layer can be used to transform the extracted data into a model format to be loaded into the customer schema of the data warehouse.

In accordance with an embodiment, activation plans 186 can be used to control the operation of the data pipeline or process services for a customer, for a particular functional area, to address that customer's (tenant's) particular needs. For example, an activation plan can define a number of extract, transform, and load (publish) services or steps to be run in a certain order, at a certain time of day, and within a certain window of time.

Figure 6:
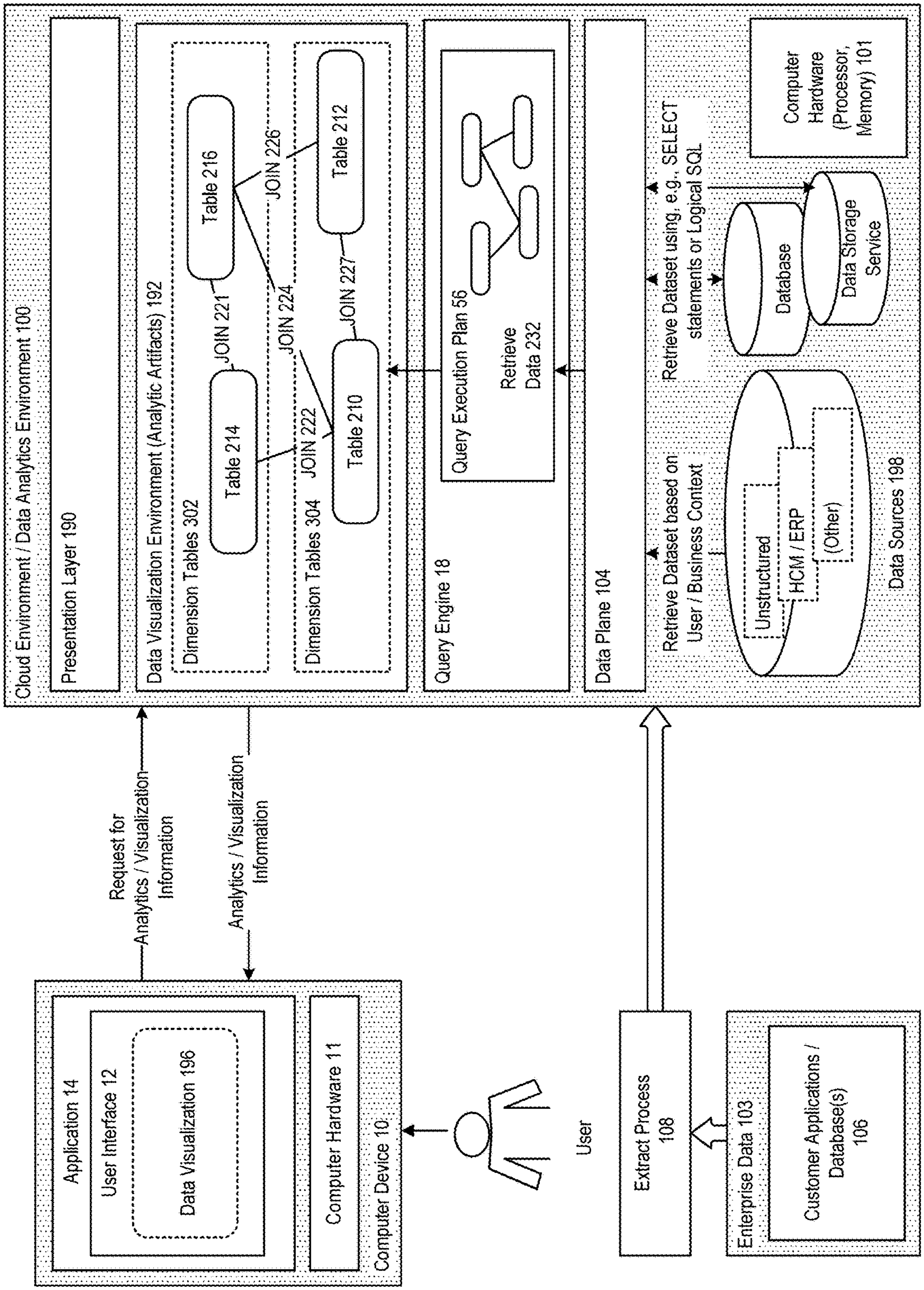
FIG. 6 further illustrates an example cloud or data analytics environment, in accordance with an embodiment.

FIG. 6 further illustrates an example cloud or data analytics environment, in accordance with an embodiment.

Generally described, within a database or data warehouse, the data of interest may be spread across multiple tables. In such environments, joins can be used to stitch the data from various tables together, to better prepare the data for analysis.

For example, as illustrated in FIG. 6, in accordance with an embodiment, the cloud or data analytics environment enables a dataset to be retrieved, received, or prepared from one or more data source(s), for example via one or more data source connections, fact and/or dimension tables 210-216, or joins 221-227 between selections of dimension tables 302, 304.

In accordance with an embodiment, a request received at a data visualization environment to display analytic artifacts 192, for example as may be related to key performance indicators, analytics dashboards, or scorecards, can be received via a client application and user interface as described above, and communicated to the cloud or data analytics environment via a cloud service. The system can retrieve 232 an appropriate dataset using, e.g., SELECT statements, to address the user/business context, for use in generating and returning the requested data analytics or visualization information to the client.

Distributed Query Execution Via Query Federation Using Semantic Model Query Plans In accordance with an embodiment, the system supports distributed query execution via query federation using semantic model query plans.

In response to a query associated with one or more semantic models, the system generates a composite query execution plan that includes nodes directed to federated query engines having access to the semantic models. The original query is effectively partitioned such that portions of the query are distributed to concurrently-running query engines for parallel execution or processing.

The described approach can also be used to efficiently process queries potentially spanning multiple semantic models.

Figure 7:
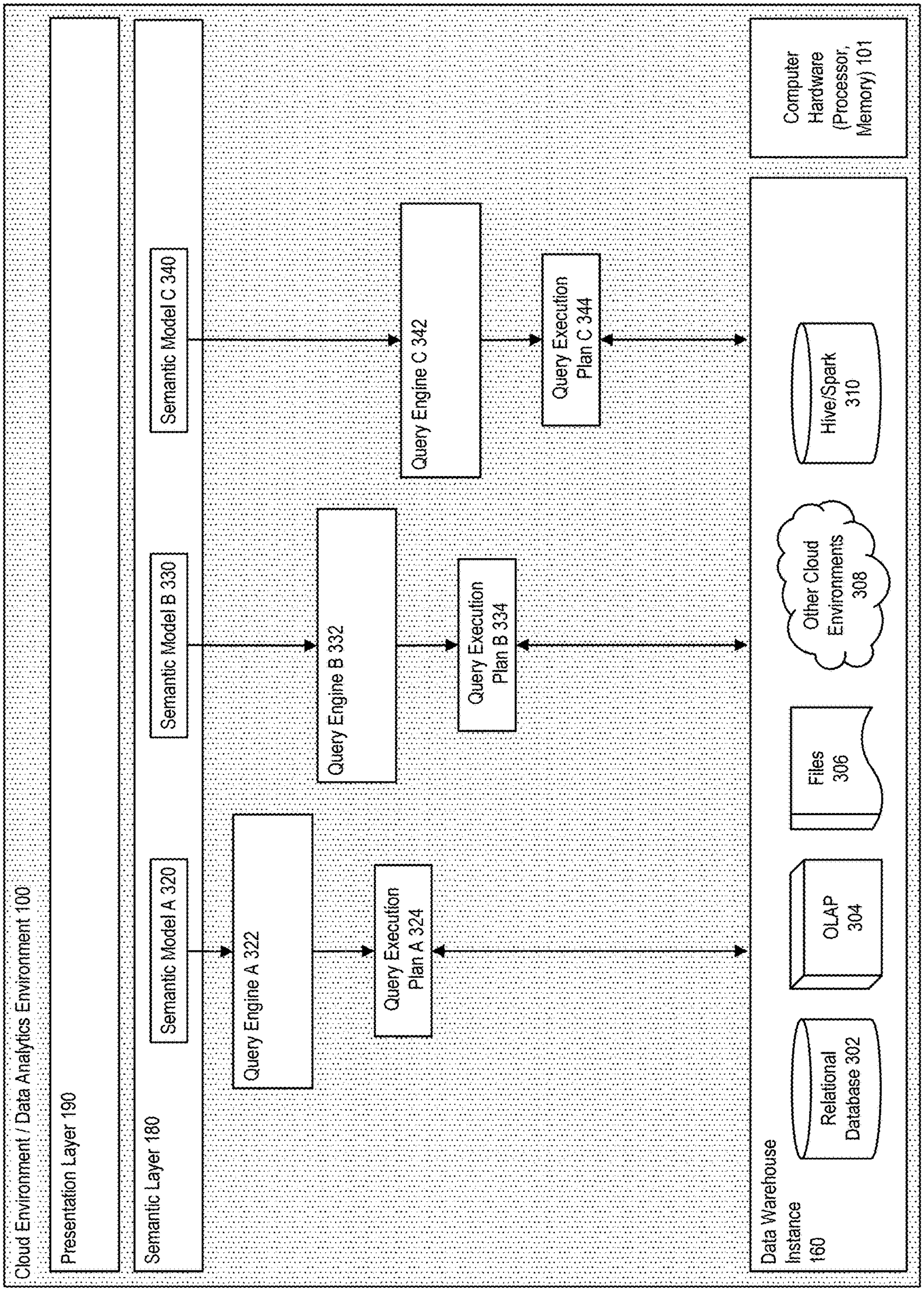
FIG. 7 illustrates query execution, in accordance with an embodiment.

FIG. 7 illustrates query execution in accordance with an embodiment that uses monolithic query execution plans.

In such an environment, query execution plans can be performed in parallel by multiple nodes via a producer/consumer design pattern. Each of a plurality of query engines A 322, B 332, C 342 can process queries associated with their respective semantic models 320, 330, 340 and query execution plans 324, 334, 344.

However, analytics query engines differ somewhat from traditional RDBMS query engines which are often the "owner" of the data files it accesses. An analytics query engine may not own any data locally, but may instead be required to perform joins across federated data originating from various different types of data stores, such as for example, a relational database 302, OLAP cube 304, files 306, another cloud environment 308, Hive/Spark 310, or REST endpoints. As such, the approach illustrated in FIG. 7 does not lend itself to distributing a particular query workload across different process to achieve a high degree of parallelization.

Figure 8:
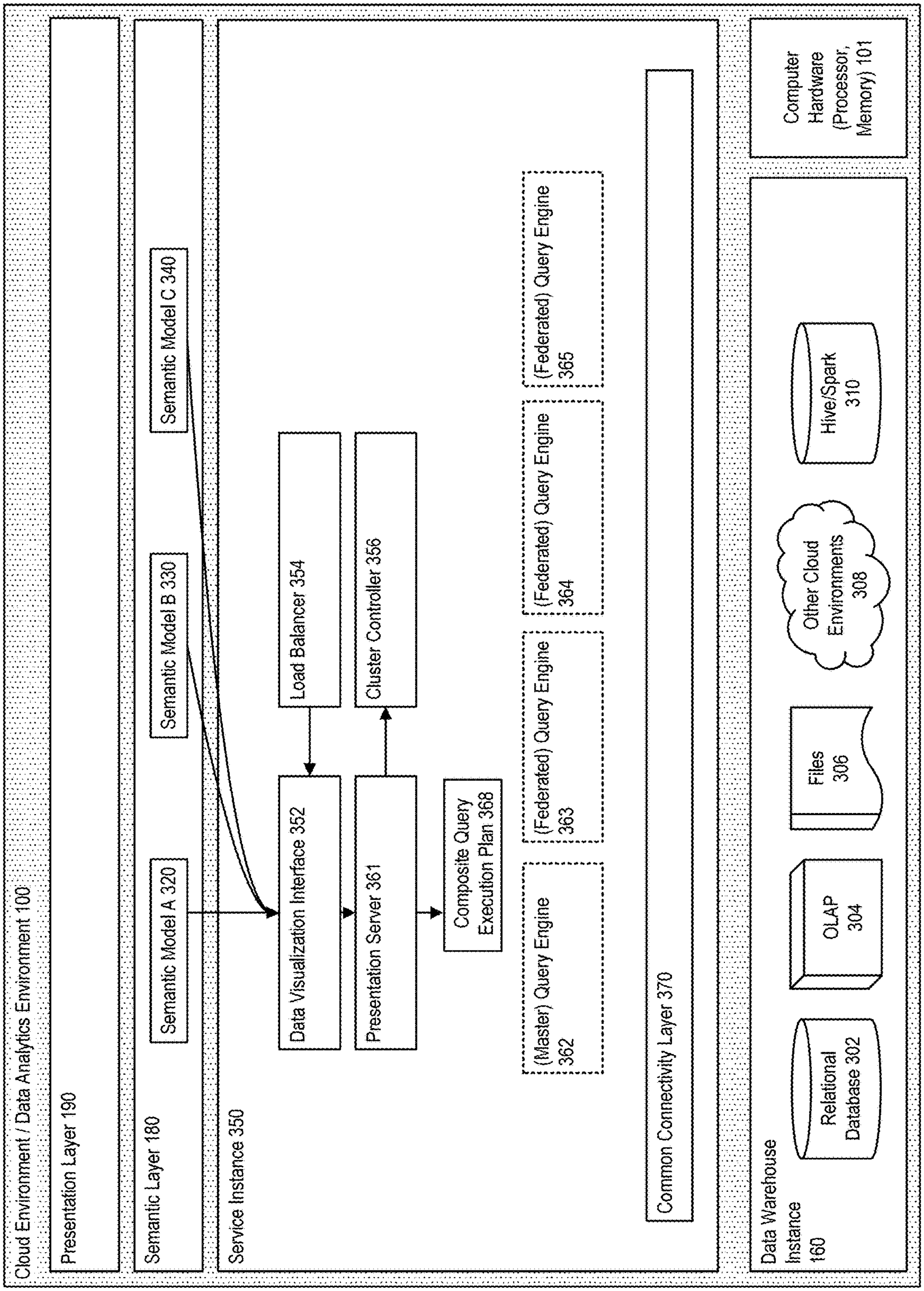
FIG. 8 illustrates a system for distributed query execution, in accordance with an embodiment.

FIG. 8 illustrates a system for distributed query execution, in accordance with an embodiment.

As illustrated in FIG. 8, in accordance with an embodiment, a service instance 350 can include a data visualization interface 352, load balancer 354, cluster controller 356, and presentation server 361 (e.g., an Oracle Business Intelligence Presentation Server, OBISP instance).

In accordance with an embodiment, the cluster controller operates to receive a logical SQL (LSQL) query and produce a logical plan of execution which identifies that there are other nodes available for execution.

In accordance with an embodiment, the load balancer operates as a query planner, knowing the number of other query executor nodes with the same semantic model, adds select_physical query nodes into the larger query execution plan. These select_physical blocks are nothing but sub-part of the initial LSQL query that was received by the master query engine/node.

In accordance with an embodiment, the master query engine/node acts as a sub-query processor that splits the LSQL query into smaller portions of select_physical plans that can be then distributed down to other execution nodes that have access to the same semantic model.

In response to a query associated with one or more semantic models, the system generates a composite query execution plan 368 that includes nodes directed to federated query engines 362, 363, 364, 365 having access to the semantic models. The original query is effectively partitioned such that portions of the query are distributed to concurrently-running query engines for parallel execution or processing, via a common connectivity layer 370 that provides access by the query engines to the various different types of data stores.

In accordance with an embodiment, instead of portioning the data, the system operates to create query execution plans that can generate partitioned plans of execution, that can then be off-loaded to other concurrently-running query engines for truly parallel execution. The master query engine/node produces a query execution plan that has nodes that are marked for other query engines. These other query engines are effectively clones of the master node with access to the same semantic model.

In accordance with an embodiment implemented as, for example, a Kubernetes microservice environment, each of the federated query engines communicate with the cluster controller to understand the dynamic topology of the cluster. Query engines can receive Logical Queries from clients via an ODBC/JDBC interface. Such queries can reach any of the several nodes hosting the semantic model in the Kubernetes microservice. Once the query is received at any one of the nodes, the node determines the number of other nodes available with same semantic model, and starts to compile the query with that dynamic knowledge of the system.

Figure 9:
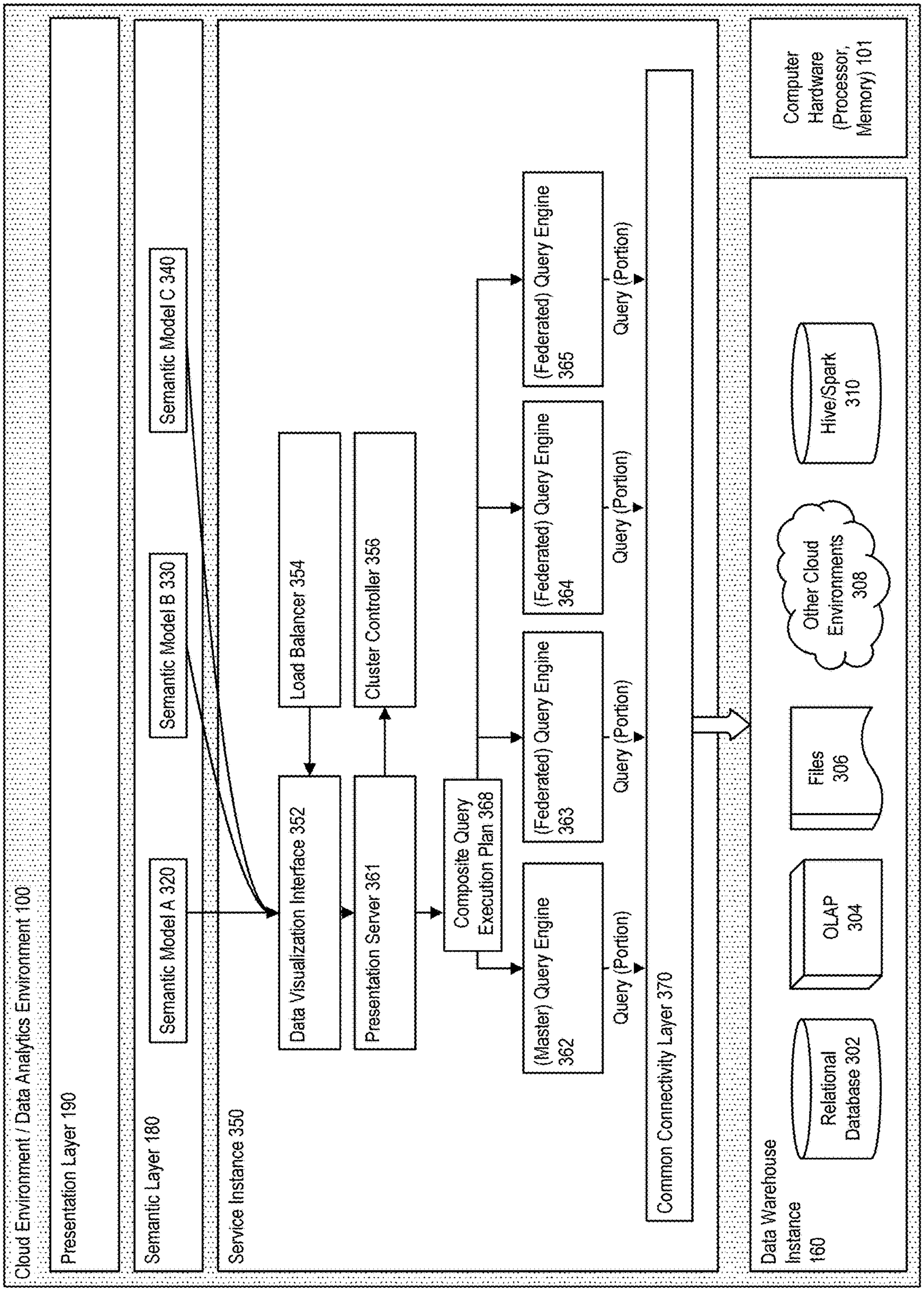
FIG. 9 further illustrates a system for distributed query execution, in accordance with an embodiment.

FIG. 9 further illustrates a system for distributed query execution, in accordance with an embodiment.

As illustrated in FIG. 9, in accordance with an embodiment, for example, if the system detects additional analytics query engine nodes then it will generate an intermediate query execution plan with select_physical wrapping that can be off-loaded to the other execution nodes, hence achieving parallel execution.

Figure 10:
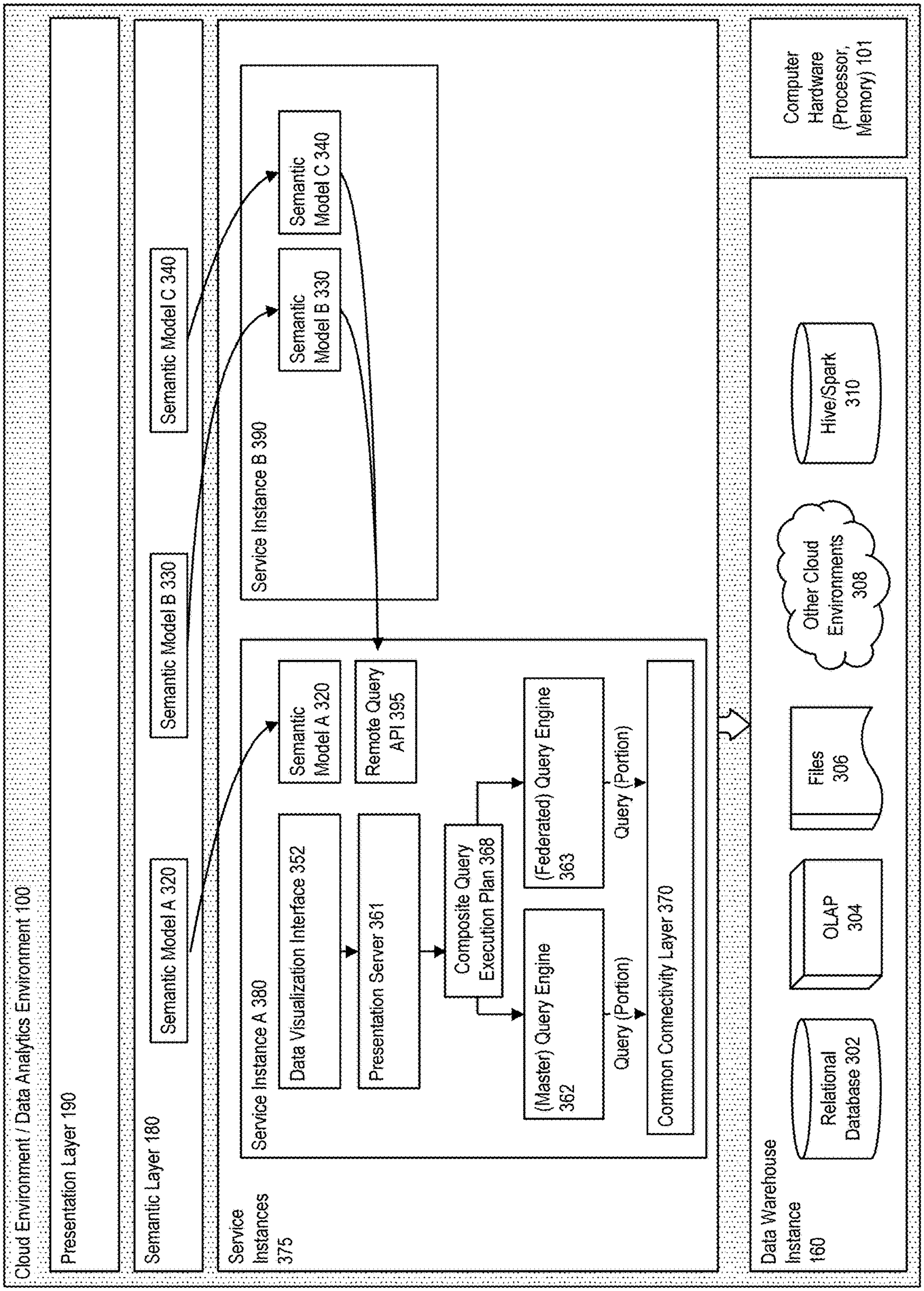
FIG. 10 further illustrates a system for distributed query execution, in accordance with an embodiment.

FIG. 10 further illustrates a system for distributed query execution, in accordance with an embodiment.

As illustrated in FIG. 10, in accordance with an embodiment, the described approach can also be used to efficiently process queries potentially spanning multiple semantic models. Each of one or more service instances 375, e.g., A 380, B 390, can include a remote query API 395 that enables queries to be processed by that service instance, spanning a semantic model provided by another service instance.

EXAMPLE

In accordance with an example provided below, an original query receives a LSQL:

SELECT DISTINCT
"Workforce Management-Worker Assignment Real Time".
"Worker Assignment Details".
"Sal Review Period Frequency",
descriptor_idof
("Workforce Management-Worker Assignment Real Time".
"Worker Assignment Details".
"Sal Review Period Frequency")
FROM
"Workforce Management—Worker Assignment Real Time"

In accordance with an embodiment, the above SQL is compiled into the following logical plans, which are derived using semantic model metadata, that take the above SQL that uses presentation table names and derive the corresponding physical source:

RqList <<286671819>> [for database 1:23:HCM_Model, 144] distinct
ifnull (D2.c1, D1.c2) as c1 [for database 1:23:HCM_Model, 144],
D1.c2 as c2 [for database 1:23:HCM_Model, 144]
Child Nodes (RqJoinSpec): <<286671827>> [for database 1:23:HCM_Model, 144]
RqJoinNode <<286671828>> [ ]
(
RqList <<286671831>> [for database 1:23:HCM_Model, 144]
HCM_Model.AssignAM.AssignFactPVO.AssignPEOSalRevPdFreq as c2 GB [for database 1:23:HCM_Model, 144]
Child Nodes (RqJoinSpec): <<286671835>> [for database 1:23:HCM_Model, 144]
RqJoinNode <<286671836>> [ ]
HCM_Model.AssignAM.AssignFactPVO T493059
) as D1 LeftOuterJoin (left drive)<<286671829>> On D1.c2=D2.c2
(
RqList <<286671843>> [for database 1:23:HCM_Model, 144]
HCM_Model.HcmBILookup.Meaning as c1 [for database 1:23:HCM_Model, 144],
HCM_Model.HcmBILookup.LookupCode as c2 [for database 1:23:HCM_Model, 144]
Child Nodes (RqJoinSpec): <<286671849>> [for database 1:23:HCM_Model, 144]
RqJoinNode <<286671850>> [ ]
HCM_Model.HcmBILookup T492956
DetailFilter: HCM_Model.HcmBILookup.LookupType=
'FREQUENCY' [for database 1:23:HCM_Model, 144]
) as D2

In accordance with an embodiment, the logical plan is assessed and the system determines the number of other query engines available with the same semantic models:

RqList <<286671743>> [for database 1:23:HCM_Model, 144] distinct
ifnull (D2.c1, D1.c2) as c1 [for database 1:23:HCM_Model, 144],
D1.c2 as c2 [for database 1:23:HCM_Model, 144] Child Nodes (RqJoinSpec): <<286671755>> [for database 1:23:HCM_Model, 144]
RqJoinNode <<286671754>> [ ] (RqList <<286671685>> [for database 1:23:HCM_Model, 144] HCM_Model.AssignAM.AssignFactPVO.AssignPEOSalRevPdFreq as c2 [for database 1:23:HCM_Model, 144] Child Nodes (RqJoinSpec): <<286671740>> [for database 1:23:HCM_Model, 144]
RqJoinNode <<286671716>> [ ]
HCM_Model.AssignAM.AssignFactPVO T493059
) as D1 LeftOuterJoin (left drive)<<286671753>> On D1.c2=D2.c2
(
RqList <<286671765>> [for database 1:23:HCM_Model, 144]
HCM_Model.HcmBILookup.Meaning as c1 [for database 1:23:HCM_Model, 144], HCM_Model.HcmBILookup.LookupCode as c2 [for database 1:23:HCM_Model, 144]
Child Nodes (RqJoinSpec): <<286671770>> [for database 1:23:HCM_Model, 144]
RqJoinNode <<286671769>> [ ]
HCM_Model.HcmBILookup T492956
DetailFilter: HCM_Model.HcmBILookup.LookupType=
'FREQUENCY' [for database 1:23:HCM_Model, 144]
) as D2

In accordance with an embodiment, eventually the query execution plan then generates queries that can be off-loaded to other similar query engines:

```
select distinct ifnull (D2.c1, D1.c2) as c1,
  D1.c2 as c2
from
  (select_physical
"HCM_Model" . . . "HCM_Model.AssignAM.AssignFactPVO"."AssignPEOSalRevPdFreq" as c2
  from
  "HCM_Model" . . . "HCM_Model.AssignAM.AssignFactPVO"
  ) D1 left outer join (select_physical
"HCM_Model" . . . "HCM_Model.HcmBILookup"."Meaning" as c1,
  "HCM_Model" . . . "HCM_Model.HcmBILookup"."LookupCode" as c2
  from
  "HCM_Model" . . . "HCM_Model.HcmBILookup"
where ("HCM_Model" . . . "HCM_Model.HcmBILookup"."LookupType"=
  'FREQUENCY')
  ) D2 On D1.c2=D2.c2
```

In accordance with an embodiment, each of these select_physical blocks represent the parallel blocks that can be then off-loaded to different query execution process which can execute these blocks in parallel and return results back to the master node. In this design pattern any node can act as the master as it compiles and off-loads the query to the other available query engines.

Figure 11:
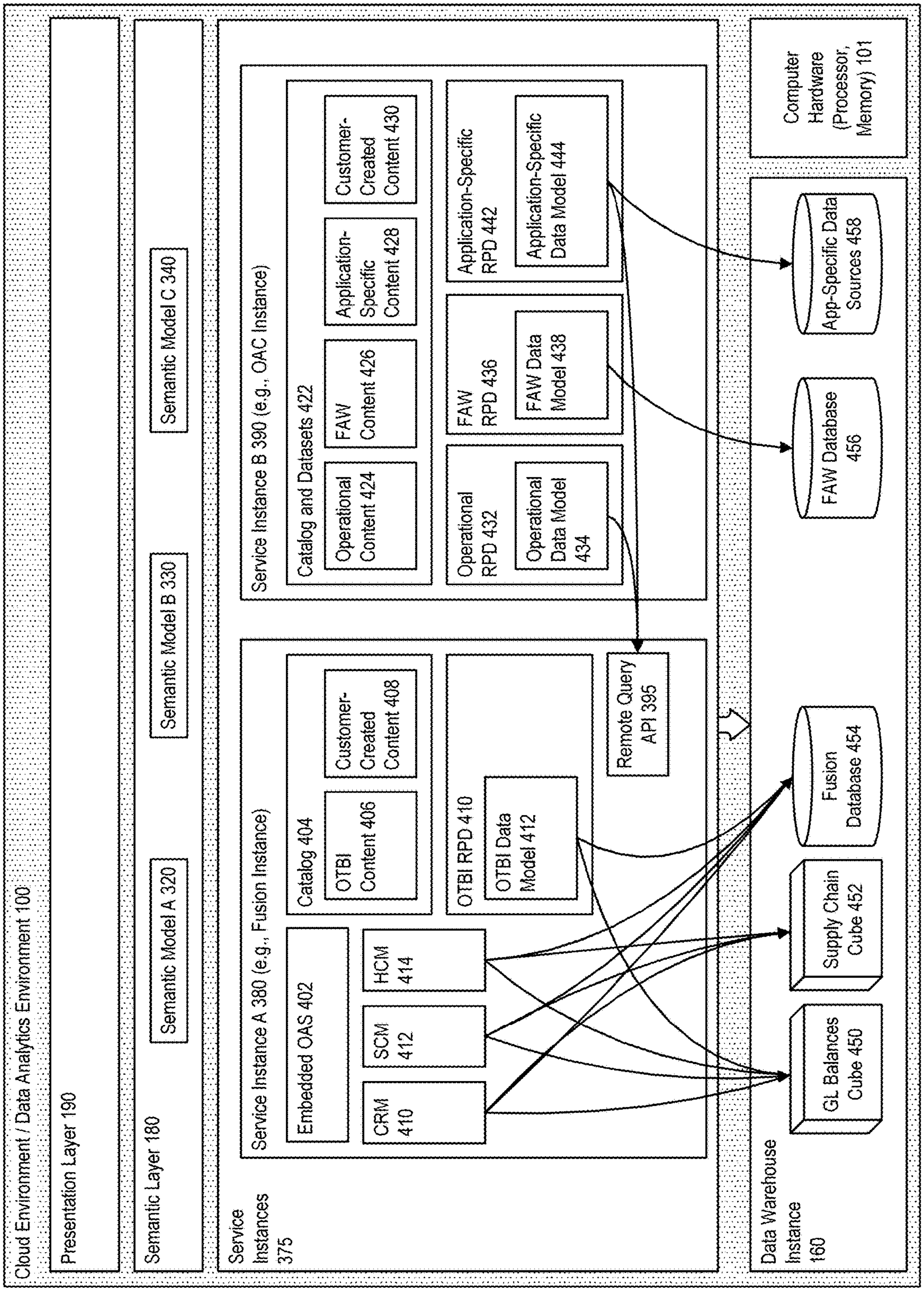
FIG. 11 illustrates an example use of a system for distributed query execution, in accordance with an embodiment.

FIG. 11 illustrates an example use of a system for distributed query execution, in accordance with an embodiment.

As illustrated in FIG. 11, in accordance with an embodiment that includes, for example, a Fusion Instance, including embedded Oracle Analytics Server (OAS) 402, catalog 404, Oracle Transactional Business Intelligence (OTBI) content 406, customer-created content 408, OTBI RPD 410, and OTBI data model 412; an OAC instance, including catalog and datasets 422, operational content 424, FAW content 426, application-specific content 428, customer-created content 430, operational RPD 432, operational data model 434, FAW RPD 436, FAW data model 438, application-specific RPD 442, and application-specific data model 444; and a data warehouse instance that includes a GL balances cube 450, supply chain cube 452, Fusion database 454, FAW database 456, and app-specific data sources 458; each of the data columns, e.g., CRM 410, SCM 412, HCM 414, can be associated with different semantic models that are used to surface the tables and columns according to that semantic model. In response to a query associated with one or more semantic models, the system generates a composite query execution plan that includes nodes directed to federated query engines having access to the semantic models.

Figure 12:
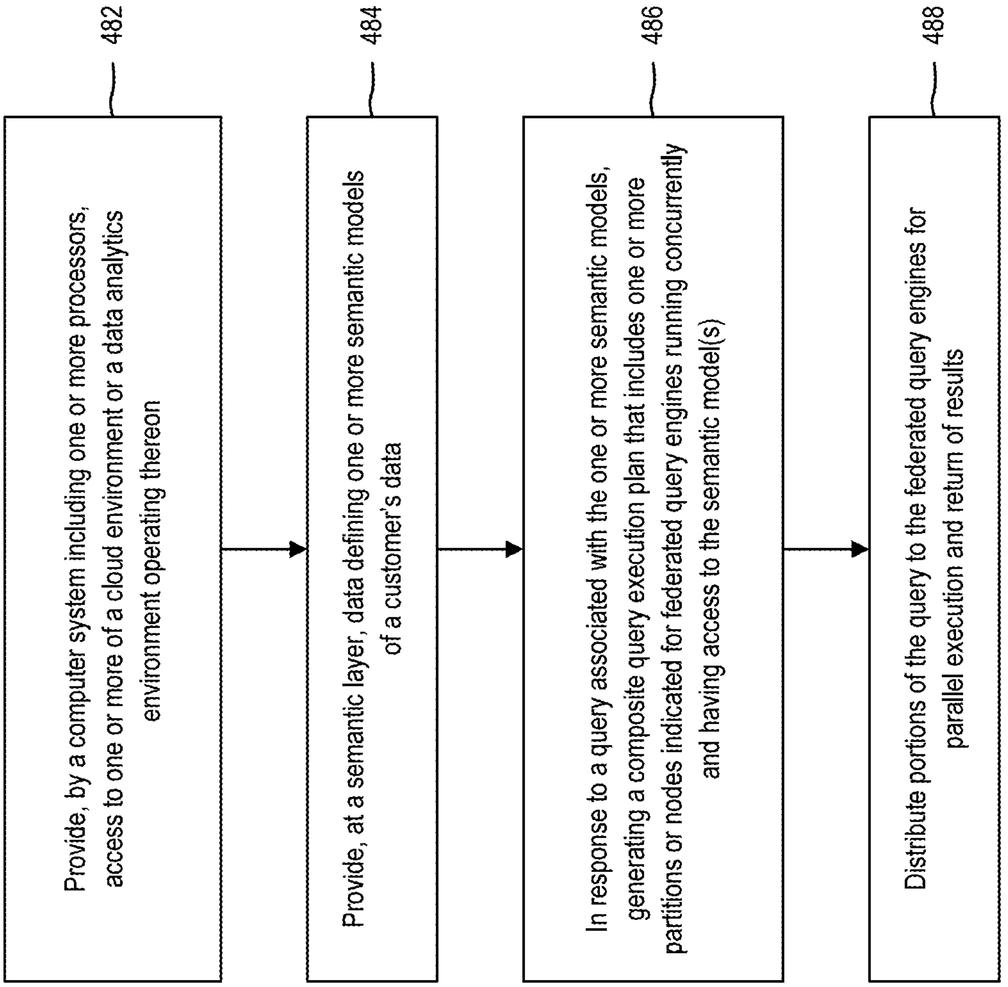
FIG. 12 illustrates a method for distributed query execution, in accordance with an embodiment.

FIG. 12 illustrates a method for distributed query execution, in accordance with an embodiment.

As illustrated in FIG. 12, in accordance with an embodiment, at step 482, a computer system including one or more processors provides access to one or more of a cloud infrastructure environment or a cloud or data analytics environment operating thereon.

At step 484, a semantic layer provides data defining one or more semantic models of a customer's data.

At step 486, in response to a query associated with the one or more semantic models, the system generates a composite query execution plan that includes one or more partitions or nodes indicated for federated query engines running concurrently and having access to the semantic model(s).

At step 488, portions of the query are distributed to the federated query engines for parallel execution or processing and return of results.

Technical Advantages

In accordance with an embodiment, various technical advantages of the systems and methods described herein can include, for example:

Distributed query execution via query execution plan splitting during query federation and target marking of the execution nodes.

Dynamic election of a query engine master that is partitioned by semantic models and have the capability to compile and act as an assimilator for any query.

An ability to host a cluster of nodes with semantic models and that can distribute and execute queries concurrently, efficiently utilizing compute capacity.

In accordance with various embodiments, the systems and methods described herein can be implemented using one or more computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, ROMs, RAMs, EPROMs, EEPROMs, DRAMs, VRAMs, flash memory devices, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art. For example, although several of the examples provided herein illustrate use with cloud environments such as Oracle Analytics Cloud; in accordance with various embodiments, the systems and methods described herein can be used with other types of enterprise software applications, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for distributed query execution via query federation using semantic model query plans, comprising:

a computer including one or more processors, and a cloud or data analytics environment provided thereon, said cloud or data analytics environment comprising a semantic layer that includes a semantic model of a customer's data, and a plurality of nodes operating as a federated query engine to serve analytical queries or requests from clients directed to data stored at a database;

wherein in response to a query associated with one or more semantic models, a node operating as a master query engine generates a composite query execution plan that includes a selection of available nodes operating as query engines and having access to the one or more semantic models, so that the query is effectively partitioned and that portions of the query can be distributed to concurrently-running query engines; and wherein the portions of the query defined by the composite query execution plan are distributed to the concurrently-running query engines for parallel execution or processing.

2. The system of claim 1, wherein a query engine can include a logical or business model, or metadata, that describes the data available as subject areas for queries;

a request generator that takes incoming queries and turns them into physical queries for use with a connected data source; and a navigator that takes the incoming query, navigates the logical model and generates those physical queries that best return the data required for a particular query.

3. The system of claim 1, wherein a query engine operates to perform joins across federated data originating from various different types of data stores.

4. The system of claim 1, wherein the system is used to process queries spanning multiple semantic models.

5. The system of claim 1, wherein the system is provided within or as part of a cloud environment.

6. The system of claim 1, wherein in response to a received query, the system determines a number of query engines available with access to the one or more semantic models, for use in processing the received query.

7. The system of claim 1, wherein each of one or more service instances include a remote query API that enables queries to be processed by that service instance using a semantic model provided by another service instance.

8. A method for distributed query execution via query federation using semantic model query plans, comprising:

providing, at a computer system including one or more processors, a cloud or data analytics environment provided thereon, said cloud or data analytics environment comprising a semantic layer that includes a semantic model of a customer's data, and a plurality of nodes operating as a federated query engine to serve analytical queries or requests from clients directed to data stored at a database;

in response to a query associated with one or more semantic models, generating, by a node operating as a master query engine, a composite query execution plan that includes a selection of available nodes operating as query engines and having access to the one or more semantic models, so that the query is effectively partitioned and that portions of the query can be distributed to concurrently-running query engines; and distributing the portions of the query defined by the composite query execution plan to the concurrently-running query engines for parallel execution or processing.

9. The method of claim 8, wherein a query engine can include a logical or business model, or metadata, that describes the data available as subject areas for queries;

a request generator that takes incoming queries and turns them into physical queries for use with a connected data source; and a navigator that takes the incoming query, navigates the logical model and generates those physical queries that best return the data required for a particular query.

10. The method of claim 8, wherein a query engine operates to perform joins across federated data originating from various different types of data stores.

11. The method of claim 8, wherein the system is used to process queries spanning multiple semantic models.

12. The method of claim 8, wherein the system is provided within or as part of a cloud environment.

13. The method of claim 8, wherein in response to a received query, the system determines a number of query engines available with access to the one or more semantic models, for use in processing the received query.

14. The method of claim 8, wherein each of one or more service instances include a remote query API that enables queries to be processed by that service instance using a semantic model provided by another service instance.

15. A non-transitory computer readable storage medium, including instructions stored thereon which when read and executed by one or more computers cause the one or more computers to perform a method comprising:

providing, at a computer system including one or more processors, a cloud or data analytics environment provided thereon, said cloud or data analytics environment comprising a semantic layer that includes a semantic model of a customer's data, and a plurality of nodes operating as a federated query engine to serve analytical queries or requests from clients directed to data stored at a database;

in response to a query associated with one or more semantic models, generating, by a node operating as a master query engine, a composite query execution plan that includes a selection of available nodes operating as query engines and having access to the one or more semantic models, so that the query is effectively partitioned and that portions of the query can be distributed to concurrently-running query engines; and distributing the portions of the query defined by the composite query execution plan to the concurrently-running query engines for parallel execution or processing.

16. The non-transitory computer readable storage medium of claim 15, wherein a query engine can include a logical or business model, or metadata, that describes the data available as subject areas for queries;

a request generator that takes incoming queries and turns them into physical queries for use with a connected data source; and a navigator that takes the incoming query, navigates the logical model and generates those physical queries that best return the data required for a particular query.

17. The non-transitory computer readable storage medium of claim 15, wherein a query engine operates to perform joins across federated data originating from various different types of data stores.

18. The non-transitory computer readable storage medium of claim 15, wherein the system is used to process queries spanning multiple semantic models.

19. The non-transitory computer readable storage medium of claim 15, wherein the system is provided within or as part of a cloud environment.

20. The non-transitory computer readable storage medium of claim 15, wherein in response to a received query, the system determines a number of query engines available with access to the one or more semantic models, for use in processing the received query;

wherein each of one or more service instances include a remote query API that enables queries to be processed by that service instance using a semantic model provided by another service instance.

* * * * *